United States Patent [19]

Fong et al.

[11] 4,041,006

[45] Aug. 9, 1977

[54] FLOCCULANT COMPOSITION AND PROCESS

[75] Inventors: Ronald A. Fong, Levittown; James A. Latty, Wallingford; Roger P. McDonnell, Warminster, all of Pa.

[73] Assignee: Rohm and Haas Company, Philadelphia, Pa.

[21] Appl. No.: 626,897

[22] Filed: Oct. 29, 1975

Related U.S. Application Data

[63] Continuation-in-part of Ser. No. 571,884, April 25, 1975, abandoned.

[51] Int. Cl.² ............... C08F 28/02; C08K 5/01; C08K 5/54

[52] U.S. Cl. ............... 260/33.6 UA; 252/88; 260/29.1 SB; 260/31.2 N; 260/34.2; 260/79.5 R; 260/79.5 NV; 526/23; 526/30

[58] Field of Search ........ 260/33.6 UA, 34.2, 79.3 R, 260/79.5 R, 79.5 NV, 31.2 N, 29.1 SB; 252/88; 526/23, 30

[56] References Cited

U.S. PATENT DOCUMENTS

| | | | |
|---|---|---|---|
| 2,068,489 | 1/1937 | Harris | 252/88 |
| 2,813,040 | 11/1957 | Rowe et al. | 106/307 |
| 3,406,139 | 10/1968 | Hurwitz | 260/29.6 HN |

*Primary Examiner*—Donald E. Czaja
*Assistant Examiner*—H. H. Fletcher

[57] ABSTRACT

Oil-dispersed poly(vinylimidazoline) and poly(2-vinylimidazolinium) bisulfate flocculant compositions and process for in situ preparation of same.

12 Claims, No Drawings

FLOCCULANT COMPOSITION AND PROCESS

This is a continuation-in-part of our prior co-pending application Ser. No. 571,884, filed Apr. 25, 1975, now abandoned.

This invention concerns poly(vinylimidazoline) and poly(2-vinylimidazolinium)bisulfate flocculant dispersions in an inert oil and the in situ formation of the same.

Various organic polymer flocculants are well known for use in de-watering sludges (such as sewage sludge) or otherwise concentrating solids into a more disposable mass. Illustrative commercial applications of such polymers include clarification of aqueous systems, pulp and paper making operations, stabilizers for drilling muds, and in the recovery of petroleum from wells. Poly(2-vinylimidazolinium)bisulfate is well-known to be useful commercially as a multi-purpose polymeric flocculant (Hurwitz et al, U.S. Pat. No. 3,406,139).

Many of the polymeric flocculants are extremely difficult to handle in the dry powder form since they tend to dust and may be hazardous if inhaled in high concentrations or contact the eyes. Workers unfamiliar with the management and control of hazardous chemicals are therefore susceptible to frequent misuse of these materials. Further, powders are difficult to feed directly in an industrial process, are not easily dissolved in water prior to flocculation, and require plant workers to use respirators, eye goggles and the like. Poly(2-vinylimidazolinium)bisulfate is especially difficult to handle due to its fine particle form, acid content and hygroscopicity (requiring a suitable vapor barrier during storage and shipment).

In recent years there has been a trend toward use of polymer flocculants in other than the dry powder form. It has been suggested therefore to use such materials as components of emulsions (see Anderson et al, U.S. Pat. No. 3,826,771), or dissolved in water (see Anderson et al, U.S. Pat. No. 3,734,873). Unfortunately, poly(2-vinylimidazolinium)bisulfate is only slightly soluble in water and, to the extent soluble, forms a highly viscous solution even at low concentrations.

The prior art process of making poly 2-vinylimidazolinium bisulfate involves reacting poly-acrylonitrile with ethylene diamine in the presence of a solvent and catalyst and thereafter neutralizing the resulting poly-vinylimidazoline to form poly(2-vinylimidazolinium)bisulfate. After formation in the salt form, the polymer is stripped of solvents, centrifuged, and dried to a fine powder. During the centrifugation step, care must be exercised to prevent moisture pick-up, by the hygroscopic product. The drying step must be even more strictly controlled due to the sensitivity of the polymer to temperature, and the potential for reducing the molecular weight when overheating. Depolymerization, among other things, may result in reduction of efficacy of the polymer as a flocculant.

OBJECTS

It is therefore an object of this invention to provide poly(2-vinylimidazolinium)bisulfate in a dispersed liquid form which may be handled more easily in commercial applications when used as a flocculant.

Another object of the invention is to provide a stable dispersion of poly(vinylimidazoline) in oil which may be added to aqueous sulfuric acid solutions prior to use as a flocculant.

Another object of the invention is to produce a flocculant composition comprising poly(2-vinylimidazolinium)bisulfate dispersed in an inert oily medium having high stability.

Another object of this invention is to provide a process for producing poly(2-vinylimidazolinium)bisulfate in situ in the presence of an oily dispersion medium.

Another object of this invention is to provide a process for producing poly(2-vinylimidazolinium)bisulfate in situ avoiding the usual steps of centrifuging and drying the reaction mixture as practiced heretofore.

Another object is to provide a dispersed liquid flocculant composition which may be easily handled in a deflocculation operation without dusting of the polymer or hazards due to inhalation or eye contact, and which may be added to water to readily form dilute solutions of poly(2-vinylimidazolinium)bisulfate in water.

In a principal embodiment, this invention is directed to a stable anhydrous dispersion of poly(2-vinylimidazolinium)bisulfate in an inert oil which may be safely and conveniently handled. The dispersion is formed by a novel process which yields a product in its final formulated form after salt formation in an inert oil. Omission of the costly, if not product-degrading, batch centrifugation and drying steps in the manufacturing process constitute key process improvements over the prior art process for manufacturing poly(2-vinylimidazolinium)bisulfate.

In another embodiment, the invention relates to stable dispersions of poly(vinylimidazolinium) in oil which may be subsequently converted, for use, to the bisulfate form by addition to aqueous solutions of sulfuric acid. The process for manufacturing this intermediate form of the flocculant also avoids the undesirable prior art steps of batch centrifugation and drying.

It is known from U.S. Pat. No. 3,406,139 to react acrylonitrile polymer with ethylenediamine in the presence of a catalyst containing at least one element selected from sulfur, selenium and tellurium and an organic solvent (and optionally a dispersant) to produce poly(vinylimidazoline) which is thereafter converted to the bisulfate form.

It has now been found that by conducting the imidazolation in the presence of a low boiling solvent, e.g., toluene, the poly(vinylimidazoline) intermediate can be readily separated from the solvent by distillation and dispersed in an inert oil. Optionally, the intermediate may be left in this form to be converted, e.g., by the ultimate user, into the bisulfate form prior to flocculation, or reacted further to the bisulfate form which may later be dissolved by the user to use concentration. The reactions for producing poly(2-vinylimidazolinium)bisulfate may be illustrated as follows:

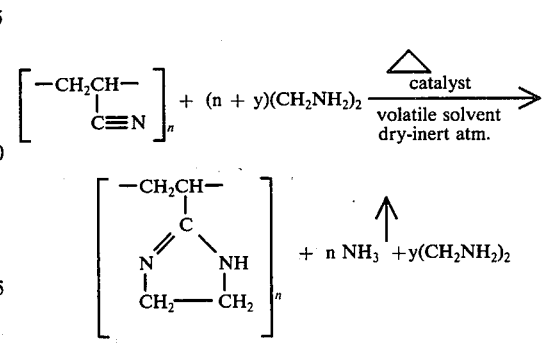

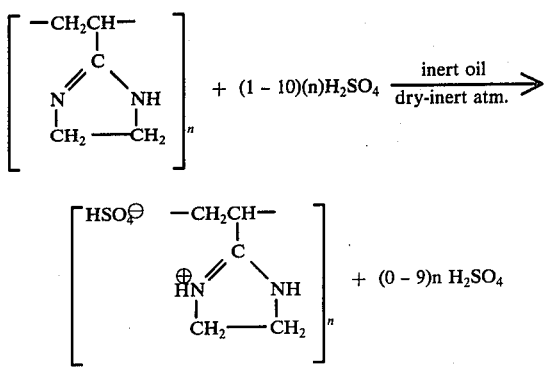

n represents the number of moles of reactants and products and y represents the moles of excess EDA For convenience herein and in the claims, Reaction I may alternatively be termed "imidazolation" and Reaction II may alternatively be term "neutralization." Unlike the method used heretofore (Hurwitz patent, mentioned supra) and added solvent used for imidazolation is removed by distillation together with any excess ethylene diamine (herein alternatively EDA) before neutralization and therefore the selection of a low boiling solvent is most preferred to achieve complete solvent removal. Reaction I is complete when the evolution of ammonia ceases. During imidazolation the temperature is maintained below about 100° C and preferably at or below about 85° C, to avoid crosslinking to form poly-(N'-aminoethyl)vinyl carboxamidine. Imidazolation is conducted in the presence of a dry inert atmosphere, such as dry $N_2$ to prevent hydrolysis of poly(2-vinylimidazoline) to aminoethyl acrylamide, amine oxidations, and to drive off the ammonia by-product. The use of a dispersant such as powdered silica to prevent agglomeration of the reaction product is preferred, but not essential.

Since Reaction I is conducted under approximately the same conditions as imidazolation in the prior art (except for the preferred catalyst) Hurwitz U.S. Pat. No. 3,406,139 representing the prior art process is hereby incorporated herein by reference.

Concurrently with the removal of solvent and ethylene diamine from the reaction product of Reaction I an inert oil is added in such an amount as to follow formulation of the final product as a dispersion containing up to 65%, preferably up to 50% by weight of polymer flocculant.

In the case of poly(vinylimidazoline) the dispersion may contain up to about 50% solids (the remainder oil), preferably between about 35% and 45% solids.

Poly(vinylimidazoline) in oil, preferably containing the stabilizing adjuvents disclosed herein, forms a stable dispersion which may be marketed in such form as a "concentrate" or "intermediate" to be converted by a user or distributor, or may be further reacted to the bisulfate form which may be optionally marketed as a flocculant requiring only dissolution for use.

Neutralization of the imidazoline by sulfuric acid in the presence of a cosolvent (to aid reaction of the sulfuric acid with poly(vinylimidazoline)), under an inert dry atmosphere, may be conducted at a temperature between 0° C and 75° C, preferably between 15° C and 50° C. The product is thereafter stripped of the cosolvent.

The reaction product of Reaction II, after stripping off cosolvent is a finely divided dispersion of poly(2-vinylimidazolinium)bisulfate in oil, suitable, without further processing or additives, for commercial use as a flocculant. Optionally, however, it may be desirable to add other adjuvant ingredients such as surfactants, perfumes, stabilizers, thickeners or viscosity improvers to enhance the viscosity, odor, freeze-thaw stability and other properties of the dispersion.

By obviating the difficult steps of centrifugation and drying of the heat-sensitive and hygroscopic polymer, the present invention inherently reduces commercial production costs and prevents the likely degradation of the product. Although the performance of the product of the present invention is not dependent upon any theory or hypothesis expressed therein, nor do we wish to be bound to any, it is postulated that moisture and excess heat generated during drying may lead to depolymerization and/or loss of active sites on the polymer, either of which may adversely affect its performance as a flocculant.

A polymeric dispersion product of the invention may be utilized in the same manner as a powdered flocculant, i.e., it may be dissolved in water and added to sewage sludge in a treatment plant. Due to the dispersed form of the flocculant it is much more easily dissolved in water, eliminating the problems of agglomeration encountered heretofore with powders. Further, the active flocculant polymer is much safer to handle by workmen in an industrial application due to its non-dusting, oil-enveloped form.

To carry out the process of the invention of dewatering of aqueous suspensions of finely divided water-insoluble materials, there is added into the aqueous suspension comprising suspended matter, organic and/or inorganic, to be flocculated, 0.001% to 5%, based on the weight of the suspended matter of the water-soluble linear polymer hereinabove defined (disregarding the inert oil) when the suspended matter is essentially mineral in character, and from 0.001% to 5% by weight of the polymer based on the weight of suspended matter, when it is of predominantly organic character, as in the case of a sewage sludge. This amount may vary broadly since it depends on the nature and amount of suspended matter present that is desired to be removed from the water. Also, the amount of polymer needed is relative to the speed of flocculation desired to be attained, the larger amounts being generally conducive to faster dewatering. Moreover, the precise amount of flocculant added may depend upon the particular system and frequently depend upon the size of the particles to be flocculated or the surface area thereof. For example, bentonite particles have extremely high surface areas and, when the suspended matter contains a large proportion thereof, the suspensions may require, apparently on that account, as much as 1% to 3% by weight (based on the weight of suspended matter) of the flocculating agent to produce optimum results. For most systems encountered in ore-dressing operations, however, the preferred proportions of flocculant are from 0.01 to 0.2% by weight of the suspended matter. When the suspended matter is predominantly organic, 0.001% to 5% by weight of polymer based on the weight of the suspended matter is suitable: when the suspended matter is essentially mineral in character, 0.001% to 5% by weight of polymer based on the weight of the suspended matter is suitable.

After the introduction of the flocculating agent, the suspension may be allowed to settle and then decanted or the suspension may be filtered or the suspension may be separated by filtration or centrifugation. The use of the flocculating agents of the present invention has been found to increase the extent of sedimentation, and the ease of filtration, centrifugation and flotation.

Also, the flocculating agents of the present invention are useful for facilitating the dewatering of many aqueous suspensions of organic materials whether the suspended matter is entirely organic or is a mixture of organic with inorganic materials in which the organic portion predominates by weight. Examples of such aqueous suspensions include industrial wastes, such as those discharged from dairies and canneries, distillery wastes, fermentation wastes, wastes from paper-manufacturing plants, wastes from dyeing plants, sewage suspensions such as any type of sludge derived from a sewage treatment plant, such as a digested sludge, an activated sludge, a raw or primary sludge or mixtures thereof. The filtration and sedimentation of such waste materials are generally complicated by the fact that they are rather complex in character and may include combinations of finely divided organic and/or inorganic materials which are relatively inert in conjunction with finely divided hydrophilic organic matters which are in swollen conditions and thereby tend to interfere with filtration and make the drying of either a filter cake or sediment cake practically impossible. They may also contain, besides hydrophilic polymeric materials, which swell and give the difficulties just mentioned, surface active agents such as detergents, dispersing agents and protective colloid agents, all of which tend to maintain the material in suspended condition and enhance the problems encountered in filtering and/or sedimentation.

When using the liquid flocculant compositions of the invention the inert oil portion should be disregarded when calculating the proportions of flocculant "active" needed. The oil readily separates from the flocculant upon dissolution with water to the concentration desired for flocculation and thereafter will not interfere with flocculation. Also it has been observed that the oil is selectively removed from the treated sludge, being adsorbed by the settled or filtered solids. The oil may also serve the beneficial function of allowing ready release of the dewatered filter cake from the filter.

Reaction between the acrylonitrile polymer and ethylene diamine is promoted by the use of an organic or inorganic sulfide catalyst preferably one which is capable of forming an acidic thiol group and/or generating at least trace amounts of hydrogen sulfide under the reaction conditions. Suitable catalysts include the following, alone or in combination: carbon disulfide, thioacetamide, methanesulfonic acid, p-toluenesulfonic acid, salts of dithiocarbmic acid, thioacetic acid, Dithane, elemental sulfur, $FeS+ H_2SO_4$, $CaS+ MgCl_2$, $Na_2S$, $Na_2S+$ acetic acid, and ammonium polysulfide.

The minimum amount of catalyst required for imidazolation is that which will promote catalysis, preferably about 0.1% by weight based on the polyacrylonitrile charge. Even lower amounts may be useful when reacting near optimum temperatures. A particularly preferred catalyst level when using $CS_2$ is 1.4% by weight based on the polyacrylonitrile charge. Of course much higher amounts, possibly as high as 5 – 10 times that of the preferred $CS_2$ may be permitted. The desired level is largely dictated by the extent of control desired for the reaction rate and also by the occurrence of competing side reactions.

Suitable "inert oils" useful in accordance with the practice of the present invention include those which are of mineral, vegetable and animal origin; however mineral oils which do not have reactive functional groups are to be strongly preferred. Specifically, the most desirable oils are paraffinic and contain straight or branched long chain hydrocarbons. Ideally we prefer oils composed entirely of saturated open chain (aliphatic) and saturated cyclic (naphthenic) hydrocarbons. Although it is desirable that all unsaturated and aromatic hydrocarbons be excluded as in the highly purified white mineral oils, this requirement is economically unrealistic. At best the oil should have low unsaturation, should be color stable, and should have low odor.

The viscosity range of the inert oil can be from 30 – 650 Saybolt Universal Seconds (SUS) at 100° F with preferred viscosity range at 300 – 650 SUS. Other preferred physical properties are the following:
Flash point: >300° F,
Boiling point: >345° F
Specific gravity: 0.85 – 0.90 gms/ml at 60° F Molecular weight range: between 350 – 500 g.

Many of the suitable inert dilution oils are marketed by oil suppliers such as the following:

Gulf — 450 (SUS) Paramid Oil
Citgo — Sentry 35
Sunoco — Sunpar 130 and Circusol 430 oils.
Humble Oil Company — Isopar oils (isoparaffinic oils)
Witco Chemical — Kaydol USP oil (white refined oil)
Exxon 330 SUS Neutral Oil The inertness requirement for the oil suitable for carrying the active deflocculant ingredient makes it undesirable generally to use animal or vegetable oils. This is due to the tendency of these oils to contain unsaturation, ester linkages, aromatic hydrocarbons, and other functionality easily affected by sulfuric acid. Silicone oils however have most of the desired properties required and are therefore among the preferred list of inert oils.

Among the suitable "volatile" solvents which are useful by the present invention are the aliphatic and aromatic hydrocarbons. Among the preferred aromatic hydrocarbons are toluene, xylene, ethylbenzene and benzene. The preferred aliphatic hydrocarbons would include heptane, octane (and all branched isomers thereof), and cyclohexane.

In addition to nitrogen as an inert gaseous medium for reaction, other possible inert gases are helium and argon. Elevated pressure is not desirable for the imidazolation reaction as it tends to interfere with the equilibrium reaction in an unfavorable direction, while vacuum is undesirable due to the low reaction temperature and the volatility of the solvent. Accordingly, it is preferred to operate at or near atmospheric pressure.

For removing volatile solvent under reduced pressure following imidazolation, it is desirable to hold the solution temperature between 25° and 50° C for most of the distillation, followed by an increase in temperature to 65° C for residual solvent removal. Significantly higher temperatures may be detrimental to the stability of the product.

The cosolvents of the invention are generally volatile esters such as ethyl acetate, propyl acetate, isopropyl acetate, butyl acetate, methyl formate, ethyl formate, and methyl propionate, although any inert solvent which will aid dissolution of the sulfuric acid in oil may be useful by the process of the invention. Removal of the cosolvent involves variable pressure distillation wherein the initial solution temperature is maintained relatively low, i.e., below about 50° C, and thereafter allowed to rise to 65° C for approximately 1 hour for removal of the residual solvent.

To stabilize or enhance the physical properties of the oil-dispersed poly(2-vinylimidazolinium)bisulfate composition it may be desirable to add thereto one or more optional ingredients or "adjuvants" such as surfactants, dispersants, fillers, viscosity enhancers, viscosity reducers, odor masking agents and the like. Some typical examples of suitable surfactants are:

polyethoxylated fatty alcohols
polyethoxylated fatty acids
long chain carboxylic acids and their ester derivatives such as stearic acid, oleic acid, fatty acid glycerides, alkoxylated fatty acid esters
polyoxyalkene glycols
alkyl phthalates
sorbitan monoesters
block copolymers of mixtures of ethylene and propylene oxides
alkyl phenols (Tritons) + ethoxylated alkyl phenols The preferred surfactants should be water soluble and non-reactive with poly(2-vinylimidazolinium)bisulfate.

Dispersants are useful for improving suspension stability. To prevent the formation of a hard cake of poly 2-vinylimidazolinium bisulfate due to settling, it may be desirable to include an inorganic filler such as powdered silica, Hi—Sil 233, Zeolex 23 or Microperl GT-43. Polymethacrylates and copolymers thereof are useful as viscosity enhancers while lecithin, diethanolamides of long chain acids, and bisureas (see U.S. Pat. No. 3,819,561) may be employed to reduce viscosity. Odor may be improved (to eliminate or mask the ethyl acetate and toluene odor) by incorporation of one or more perfumes such as pine oil, coconut oil, eucalyptus oil, lemon oil, peppermint oil, clove oil, etc.

EXAMPLE 1

To a 1 liter, 4-neck, resin kettle fitted with a stirrer, glass immersion thermometer, nitrogen inlet adapter, and a Friedrich condenser vented to a filter flask containing an acid solution were charged 53 parts (1.0 mole) of polyacrylonitrile, 232 parts of toluene, 5 parts of commercial powdered silica, 113 parts of ethylene diamine, and 0.75 parts of carbon disulfide (1.42% based on the weight of polyacrylonitrile). The reaction mixture was heated with stirring under $N_2$ at a temperature of 80° – 85° C for 5.5 hours, at the end of which, 92 – 97% of the theoretical quantity of ammonia was evolved. The polyvinylimidazoline product was a solid dispersed in the liquid slurry and could be isolated, dried, and used subsequently for water treatment.

EXAMPLE 2

A solvent exchange was carried out on the reaction slurry from Example 1 by charging the suspension to a 1 liter flask fitted with an addition funnel containing 225 parts of 350 SUS Neutral Oil, thermometer, stirrer, and distillation condenser. The distillation was carried out under reduced pressure, the pressure being variable during the distillation from 200 mm Hg to 20 mm Hg, while maintaining the reaction mixture temperature at or below 50° C. The distillate was replaced continuously with the oil. The resulting solution was a 28 – 31% suspension of poly(2-vinylimidazoline) in 350 Neutral Oil which could be used for water treatment.

Following the procedure from Example 2, solvent exchange was accomplished in a separate experiment by siphonation of 75% of the liquid, introduction of the oil, and final solvent removal via distillation.

Following the procedure of Example 2, solvent exchange was accomplished in three separate experiments substituting for 350 Neutral Oil (1) Squibb Mineral Oil, (2) Nujol, and (3) 650 SUS Neutral Oil.

EXAMPLE 3

The bisulfate salt of polyvinylinidazoline was synthesized by adding 115 parts of concentrated sulfuric acid and 76.2 parts of ethyl acetate as a cosolvent to the liquid dispersion in Example 2 at 250 rpm, while maintaining the solution under a dry inert atmosphere and at a temperature of 30° – 35° C. The ethyl acetate cosolvent was then removed via distillation under reduced pressure, the pressure being variable from 200 mm Hg to 50 mm Hg. The product, a 49 – 51% dispersion of polyvinylimidiazolinium bisulfate in 350 Neutral Oil, was subsequently used for facilitating filtration of sewage sludge.

Following the procedure of Example 3, a different sample of poly(2-vinylimidazoline) was neutralized at 50° C.

Following the procedure of Example 3, an additional reaction mixture corresponding to that of Example 2 was neutralized at 15° – 20° C.

EXAMPLE 4

The oil dispersion of poly 2-vinylimidazoline produced in accordance with Example 2 was added slowly and with stirring to 1,960 parts of a 5% by weight aqueous solution of sulfuric acid until complete dissolution of the polymer was obtained. The resulting aqueous solution is thereafter used effectively in water clarification.

EXAMPLE 5

To 450 parts of the suspension from Example 3 was added 13.5 parts of poly-ethoxylated fatty alcohol, a surfactant having an HLB value of 14 – 16, and 4.5 parts of powdered silica, a dispersant. The resultant product showed improved suspension stability and allowed the product to dissolve rapidly in water without the need of high speed agitation equipment.

EXAMPLE 6

Using the apparatus from Example 1, a suspension of 342 parts of xylene, 53 parts of polyacrylonitrile, 5 parts of powdered silica, 138 parts of ethylene diamine, and 0.6 parts of carbon disulfide was heated with stirring under nitrogen at 80° – 85° C for 8.5 hours with a 90 – 95% conversion being obtained. The solvent exchange was carried out with 200 parts of 350 Neutral Oil and with a solution temperature between 65° – 70° C. The polyvinylimidazoline dispersed in mineral oil could then be converted to a salt and used in paper pulp dewatering.

The procedure of Example 6 was repeated but substituting the xylene solvent with Squibb Mineral Oil.

EXAMPLE 7

The procedure in Example 1 was repeated but using 2.25 parts of carbon disulfide instead of 0.75 parts to produce poly 2-vinylimidazoline.

The procedure in Example 1 was repeated but using 1.5 parts of carbon disulfide instead of 0.75 parts to produce poly 2-vinylimidazoline.

EXAMPLE 8

Using the apparatus of Example 1, a suspension was prepared containing 342 parts of toluene, 53 parts of polyacrylonitrile, 5 parts of powdered silica, 138 parts of ethylene diamine, and 4.8 parts of methane sulfonic acid. The mixture was stirred under $N_2$ at 85° C for 17 hours after which 86.5% of the theoretical amount of ammonia was evolved. The polyvinylimidazoline was a solid which could be isolated, dried, and used subsequently for water treatment.

EXAMPLE 9

A liquid slurry prepared in accordance with Example 1 was charged to a 1 liter filter flask fitted with an addition funnel containing 284 parts of toluene, thermometer, stirrer and distillation condenser. The distillation was carried out at 175 mm Hg, with the distillate being replaced by toluene from the addition funnel. The polyvinylimidazoline was then neutralized at 15° - 20° C with 115 parts of concentrated sulfuric acid using 76.2 parts of ethyl acetate as a cosolvent. A solvent exchange with 200 parts of 350 Neutral Oil via distillation under reduced pressure was then accomlished to yield a final product composed of a 50% dispersion of polyvinylimidazolinium bisulfate in oil.

EXAMPLE 10

The procedure of Example 1 was repeated but omitting the powdered silica charge to yield poly 2-vinylimidazoline.

EXAMPLE 11 the procedure of Example 1was repeated but using the following charges: 53.0 parts of polyacrylonitrile, 5 parts of powdered silica, 138 parts of ethylene diamine, 342 parts of toluene, and 0.5 parts of carbon disulfide. The reaction was stirred under $N_2$ for 8 hours until an 85.4% conversion was obtained. The product from the liquid slurry could be isolated, dried, and used subsequently for water treatment.

EXAMPLE 12

The procedure of Example 1 was repeated but using the following charges: 53.0 parts of polyacrylonitrile, 2.5 parts of powdered silica, 99.2 parts of ethylene diamine, 173 parts of toluene, and 0.75 parts of carbon disulfide. The reaction mixture was stirred under $N_2$ for 9 hours until 95.61% conversion was obtained. The product could be processed as in Examples 2 and 3 to give polyvinylimidazolinium bisulfate dispersed in oil.

EXAMPLE 13

To a solution of 53 parts of polyacrylonitrile in 232 parts of toluene was added 5 parts of commercial powdered silica, 72.1 parts of ethylene diamine, and 1.5 parts of carbon disulfide. The reaction mixture was stirred under nitrogen for 5 hous whereby an 86% conversion to polyvinylimidazoline was obtained. A Solvent exchange with 225 parts of an inert mineral oil was carried out via distillation under reduced pressure. The bisulfate salt of the polyvinylimidiazoline was prepared by adding to the reaction mixture 76.2 parts of ethyl acetate as a cosolvent followed by the slow addition of 115 parts of concentrated sulfuric acid while maintaining the solution temperature at 30° - 35° C. Following salt formation, the ethyl acetate was removed via distillation giving a 50% dispersion of polyvinylimidazoline bisulfate in mineral oil. The product could then be used for water treatment.

EXAMPLE 14

Poly(2-vinylimidazolinium)bisulfate produced in accordance with one or more of the foregoing examples was evaluated for its efficacy in dewatering secondary treatment sewage (trickling filter) sludge by the EIMCO filter test outlined hereinafter: The polymer either liquid grade or dry powder, was dissolved in deionized water to make a 3% by weight active solution. A specified volume of the 3% solution was mixed with enough deionized water to make 100 cc of an application solution. The 100 cc of application solution was added to 1500 cc of trickling filter industrial sewage sludge and mixed by means of a two-blade stirrer at 1900 RPM for 45 seconds. A one-tenth square foot filter leaf, connected to a vacuum of 15 inches of mercury, was immersed in the 1600 cc of polymer treated sewage sludge for 1 minute. The filter leaf was removed from the sewage sludge and inverted, while still connected to the vacuum for 2 minutes. The volume of filtrate liquid collected at the end of 3 minutes was measured and the release properties of the filter cake were determined.

The data shown below were obtained by the following procedure: (a) plotting the volume of filtrate collected as a function of the weight of polymer added to the sludge, (b) drawing the best straight line to fit the data, (c) interpolating to determine the weight of polymer needed to generate 400 cc of filtrate fluid.

| Sample Number* | Sludge Solids, Wt. % | % Change in De-Watering Efficiency |
|---|---|---|
| 1 + control | 4.9 | + 3 |
| 2 + control | 4.4 | + 1 |
| 3 + control | 4.8 | + 12 |
| 4 + control | 6.2 | + 9 |

*Each sample represents two tests, one for the oil dispersed product of the invention and a control product (powdered poly(2-vinylimidazolinium)bisulfate).

The percent change in dewatering efficiency is defined as 100 times the difference between the weight of the dry powder poly(2-vinylimidazolinium)bisulfate (A), and the weight of the sample to be analyzed, the oil dispersed product (B), divided by the weight of A, when the weights were those required to generate 400 cc of filtrate liquid, (A − B/A) × 100. The change in dewatering efficiency was defined as positive if less of the sample being tested was required to generate 400 cc of filtrate than of the standard polymer.

In the test results shown above the oil-dispersed poly(2-vinylimidazolinium)bisulfate was found to be superior to the dry-powdered form of the polymer when tested with sewage sludge.

Following the procedure of Reaction II above, other salts of polyvinylimidazoline may be prepared such as chlorides, nitrates, acetates, oxalates, phosphates, phthalates and formates. Further, the oil dispersions of the invention are easily inverted in water to form aqueous solutions of the active ingredient with the inert oil forming a discrete layer on the surface of the water or being dispersed to form an oil-in-water emulsion.

EXAMPLE 15

To a 1 liter, 4-neck, resin kettle fitted with a stirrer, glass immersion thermometer, nitrogen inlet adapter, and a Friedrich condenser vented to a filter flask containing an acid solution, were charged 53 parts (1.0 mole) of polyacrylonitrile, 232 parts of toluene, 5 parts of commercial powdered silica, 113 parts of ethylene diamine, and 0.75 parts of carbon disulfide (1.42% based on the weight of polyacrylonitrile). The reaction mixture was heated with stirring under $N_2$ at a temperature of 80°–85° C for 5.5 hours, at the end of which, 92 – 97% of the theoretical quantity of ammonia was evolved. The poly(vinylimidazoline) product was a solid dispersed in the liquid slurry and could be isolated, converted to bisulfate form, dried, and used subsequently for water treatment.

EXAMPLE 16

A solvent exchange was carried out on the reaction slurry from Example 15 by charging the suspension to a 1 liter flask fitted with an addition funnel containing 178 parts of 450 SUS Neutral Oil, thermometer, stirrer, and distillation condenser. The distillation was carried out under reduced pressure, the pressure being variable during the distillation from 200 mm Hg to 20 mm Hg, while maintaning the reaction mixture temperature at or below 50° C. The distillate was replaced continuously with an equivalent weight of oil in order to maintain batch fluidity. The resulting solution was a 35% suspension of poly(vinylimidazoline) in 450 SUS oil which, after conversion to bisulfate form, could be used for water-treatment.

In order to prepare a 3% aqueous flocculant solution, 6.4 parts of the 35% suspension of poly(vinylimidazoline) in oil from Example 16 was added at 750 rpm to 145 parts of water containing 2.25 parts of sulfuric acid. The solution was stirred for one hour after which it was found suitable for use in sludge dewatering as outlined above in Example 14.

The foregoing examples illustrate desirable poly(vinylimidazoline) dispersion concentrations, but other concentratons such as one containing 45% poly(vinylimidazoline) in oil, may be even more desirable for certain applications. As is known in this art, dilution concentrations in water prior to flocculation also may be varied over a wide range of between about 1% and about 20%. When conerting oil-dispersed poly(vinylimidazoline) to the sulfate form by addition to an aqueous sulfuric acid solution, it is preferable to use about stoichiometric amounts of acid to form either the sulfate (0.5 moles $H_2SO_4$/1 mole of poly(vinylimidazoline)) or bisulfate (1 mole/1 mole) or a slight excess. In general it is preferable to use about 0.5 – 1.5 moles of sulfuric acid per mole of poly(vinylimidazoline), and sufficient water to dilute the reaction product to use concentration.

The oil dispersed composition prepared by the in situ method of the invention are superior to oil dispersed mixtures prepared by merely adding poly(vinylimidazoline) or poly(2-vinylimidazolinium) bisulfate to oil. Particles of the active materials tend to remain dispersed when prepared in situ unlike dry particles which tend to settle out and form a hard cake when added to the same oil (with the same adjuvants). Caked dispersions can be very troublesome when used to form an aqueous flocculant solution (e.g., won't pour from container).

While it is not fully understood why the in situ formed dispersions are more stable, it is postulated that particle density and size are very important factors. For example, particles of unneutralized poly(vinylimidazoline) dry powder have a density as measured by a Beckman air pychometer of about 1.27 gms/ml. whereas dry powdered poly(2 vinylimidazolinium) bisulfate has a particle density of about 1.62 gms./ml., with the former being more easily dispersed than the latter. As prepared commercially, dry powdered poly(2-vinylimidazolinium) bisulfate has a mean diameter of about 50 – 55 microns, and the same material When provided in situ in oil has a mean diameter of about 25 microns. The process for in situ preparation of C-7 in oil obviously prevents or minimizes aggregate formation since it provides an inert oil dispersion medium.

We claim:

1. A process for the in situ preparation of a vinylimidazoline polymer composition dispersed in an inert oil comprising:
    a. reacting polyacrylonitrile with ethylene diamine in mol ratios of at least about 1:1 in a volatile solvent medium containing an organic or inorganic sulfide catalyst capable of generating at least trace amounts of hydrogen sulfide while retaining the reaction medium at a temperature between 40° C. and 100° C. and under a dry inert atmosphere to produce poly(vinylimidazoline) and continuously purging off the by-product gaseous ammonia; and
    b. distilling off excess unreacted ethylene diamine and volatile solvent under reduced pressure while concurrently adding an inert oil in an amount sufficient to yield a dispersion in which the concentration is poly(vinylimidazoline) in oil of not greater than 65%.

2. The process of claim 1 wherein a cosolvent is added to the dispersion of poly(vinylimidazoline) in oil and the poly(vinylimidazoline) is contacted with sulfuric acid in mole ratios of 1:1 to 1:10 based on monomer units of the poly(vinylimidazoline) at a temperature between 0° C. and 75° C. to form a poly(2-vinylimidazolinium) bisulfate dispersion which is thereafter stripped of cosolvent to yield an oil-dispersed flocculant product.

3. A process as claimed in claim 1 wherein the imidazolation reaction is conducted at a temperature between about 50° C. and about 85° C.

4. A process as claimed in claim 1 wherein the imidazolation reaction is conducted in the presence of a catalytic amount of carbon disulfide.

5. A process as claimed in claim 2 wherein the neutralization reaction of poly(vinylimidazoline) with sulfuric acid is conducted at a temperature of between 15° C. and 50° C.

6. A process as claimed in claim 1 wherein the imidazolation reaction is conducted with acrylonitrile polymer and ethylene diamine present in mole ratios of about 1:2.

7. A process as claimed in claim 2 wherein the neutralization reaction is conducted using poly(vinylimidazoline) and sulfuric acid in mole ratios of about 1:1.2.

8. A process as claimed in claim 2 wherein the amount of inert oil added before the neutralization reaction is that necessary to yield a final dispersion comprising between 45% and 50% of poly(2-vinylimidazolinium) bisulfate.

9. A liquid flocculant concentrate comprising up to about 50% by weight of poly(vinylimidazoline) dispersed in an inert oil.

10. A liquid flocculant composition comprising up to about 65% by weight of poly(2-vinylimidazolinium) bisulfate dispersed in an inert oil, when produced in accordance with the process of claim 2.

11. A liquid floccuulant composition when prepared in accordance with the process of claim 2 and containing the following ingredients in the indicated proportions:

| | |
|---|---|
| poly (2-vinylimidazolinium) bisulfate | 45 – 50% |
| 450 neutral oil | 45 – 50% |
| residual toluene | = 0.25% |
| residual ethyl acetate | = 0.25% |
| surfactant and dispersant | 3 – 5% |

12. A liquid flocculant concentrate containing poly(vinylimidazoline) and an inert oil which may be readily converted to bisulfate salt form by addition to an acidic aqueous solution containing between 0.5 and 1.5 moles of sulfuric acid per mole of poly(vinylimidazoline) based on monomer units of the poly(vinylimidazoline).

* * * * *